(12) United States Patent
Bergstra et al.

(10) Patent No.: US 9,550,132 B2
(45) Date of Patent: Jan. 24, 2017

(54) REMOVING VOLATILE COMPOUNDS FROM POLYMER GRANULES BY VAPOUR DISTILLATION

(71) Applicant: BOREALIS AG, Vienna (AT)

(72) Inventors: Michiel Bergstra, Berchem (BE); Kai Hagane, Langesund (NO); Manfred Jarzombek, Linz (AT); Pablo Ivan Aguayo Arellano, Leonding (AT)

(73) Assignee: Borealis AG, Vienna (AT)

( * ) Notice: Subject to any disclaimer, the term of this patent is extended or adjusted under 35 U.S.C. 154(b) by 443 days.

(21) Appl. No.: 14/240,826

(22) PCT Filed: Nov. 12, 2012

(86) PCT No.: PCT/EP2012/004701
§ 371 (c)(1),
(2) Date: Feb. 25, 2014

(87) PCT Pub. No.: WO2013/072035
PCT Pub. Date: May 23, 2013

(65) Prior Publication Data
US 2014/0202847 A1     Jul. 24, 2014

(30) Foreign Application Priority Data
Nov. 14, 2011 (EP) .................................. 11009015

(51) Int. Cl.
| | |
|---|---|
| C08F 6/00 | (2006.01) |
| B01D 3/02 | (2006.01) |
| B29B 9/16 | (2006.01) |
| C08J 3/00 | (2006.01) |
| B29B 9/06 | (2006.01) |
| B29K 23/00 | (2006.01) |

(52) U.S. Cl.
CPC . B01D 3/02 (2013.01); B29B 9/16 (2013.01); C08F 6/005 (2013.01); B29B 9/065 (2013.01); B29B 2009/168 (2013.01); B29K 2023/06 (2013.01); B29K 2023/12 (2013.01)

(58) Field of Classification Search
CPC .................................... C08F 6/005; B01D 3/02
USPC ............................ 203/96; 202/166; 528/480
See application file for complete search history.

(56) References Cited

U.S. PATENT DOCUMENTS

| | | | |
|---|---|---|---|
| 5,521,264 A | 5/1996 | Mehra et al. | |
| 6,218,504 B1 | 4/2001 | Dolle et al. | |
| 2012/0016098 A1* | 1/2012 | Ballarini | ................ C08F 6/005 526/351 |

FOREIGN PATENT DOCUMENTS

| | | |
|---|---|---|
| DE | 1 9729302 | 1/1999 |
| EP | 2 072 203 | 6/2009 |
| WO | WO 98/40417 | 9/1998 |
| WO | WO 2008/080782 | 7/2008 |

OTHER PUBLICATIONS

International Search Report mailed Feb. 21, 2013 for International Application No. PCT/EP2012/004701.
Written Opinion mailed Feb. 21, 2013 for International Application No. PCT/EP2012/004701.

* cited by examiner

*Primary Examiner* — Terressa Boykin
(74) *Attorney, Agent, or Firm* — Richard M. Klein; Fay Sharpe LLP

(57) ABSTRACT

The present invention relates to a process for treating polyolefin granules in a treatment vessel comprising the steps of: —Providing a bed of granules in liquid in said treatment vessel —Withdrawing a first stream of liquid from said treatment vessel, wherein said first stream of liquid contains hydrocarboneous compounds —introducing a first stream of vapor into said treatment vessel —Withdrawing a second stream of vapor from said treatment vessel wherein said second stream of vapor contains volatile hydrocarboneous compounds —Recovering the granules from said treatment vessel wherein said first stream of vapor has a temperature from Tb to Tb+10° C., wherein Tb is the boiling point of the liquid at the applied pressure, and said first stream of vapor produces an upwards rising vapor stream in said treatment vessel, the superficial vapor velocity of which is no more than 0.2 m/s, and a plant suitable for conducting said process.

18 Claims, 5 Drawing Sheets

REMOVING VOLATILE COMPOUNDS FROM POLYMER GRANULES BY VAPOUR DISTILLATION

The invention relates to a process for treatment of plastic material, to the use of vapour for the removal of volatile components from plastic material and to a plant for removing volatile components from plastic materials.

It is known from WO 98/40417 to eliminate smell from polymers by purging steam, inert gas or air at elevated temperature. It is furthermore known from DE 19 729 302 that polypropylene granules can be separated from water and dried at 100 to 130° C.

The treatment of polymers granules such as polypropylene and polyethylene with steam and inert gas or air at elevated temperature nevertheless causes several problems. First of all, emissions, taste and odour are not sufficiently improved for a number of applications particularly in the field of drinking water applications and automobile parts. Standard purging furthermore only removes the monomer content to a low extent from the plastic material, whereby too high amounts of volatile components remain in the material. This problem is particularly important when the polymer is subjected to visbreaking. During storage of such polymers, the loss of volatile components from the granules may even lead to explosive mixtures with air in the storage silos.

Additionally, air purging may cause the risk of getting an explosive mixture of volatile hydrocarbons and air in the treater silo or blender. In order to avoid these explosive mixtures the concentration of volatiles in the air needs to be reduced which results in the use of high amounts of air. The exhaust air has to be post-treated in a catalytic oxidizer or comparable means which significantly increases the investment and operational costs.

For steam treatment high steam consumption and a high steam temperatures are required to avoid operational problems due to condensation, which both significantly increase the operational costs.

Additionally, the high steam temperatures may be harmful for certain types of plastic material causing operational problems, e.g. pellet agglomeration.

EP 2 072 203 discloses a process for removal of volatile components from plastic material by treating the material with a liquid at a temperature close to the liquid's boiling point.

Such a treatment has the drawback that the accumulation of volatile components in the liquid reduces the effectiveness of the process so that an extensive cleaning unit is required which increases the investment and operational costs.

Thus in view of the above drawbacks and disadvantages, there is a need for an improved process for treatment of plastic material which effectively removes the volatiles from the plastic material and is more cost effective.

Unless other is specifically stated, all percentage figures in the subsequent text are based on weight.

It is an object of the invention to provide a process, which allows a simplified and effective removal of volatile components with low energy consumption. It is a further object of the invention to provide a plant for carrying out such a process.

The present invention is based on the finding that these objects can be achieved by contacting polyolefin granules in liquid with a solvent in vapour form. It has surprisingly been found that by reducing the vapour velocity upon contact with the polyolefin material an effective removal of volatile components with low energy consumption due to the reduced amount of vapour can be obtained by accumulating the volatiles in the vapour and the liquid.

The present invention therefore provides a process for treating polyolefin granules in a treatment vessel comprising the steps of:
  Providing a bed of granules in liquid in said treatment vessel
  Withdrawing a first stream of liquid from said treatment vessel, wherein said first stream of liquid contains hydrocarboneous compounds
  introducing a first stream of vapour into said treatment vessel
  Withdrawing a second stream of vapour from said treatment vessel wherein said second stream of vapour contains volatile hydrocarboneous compounds
  Recovering the granules from said treatment vessel
wherein said first stream of vapour has a temperature from $T_b$ to $T_b+10°$ C., wherein $T_b$ is the boiling point of the liquid at the applied pressure, and said first stream of vapour produces an upwards rising vapour stream in said treatment vessel, the superficial vapour velocity of which is no more than 0.2 m/s.

The process may further comprise the step of
  Evaporating a part of said first stream of liquid to produce the first stream of vapour and a second stream of liquid;
and the step of
  introducing a first stream of vapour into said treatment vessel is the step of
  Reintroducing said first stream of vapour into said treatment vessel.

Hence, in case the process further comprises the step of evaporating a part of said first stream of liquid to produce the first stream of vapour and a second stream of liquid the first stream of vapour introduced into said treatment vessel is the first stream of vapour obtained in the step of evaporating a part of said first stream of liquid to produce the first stream of vapour and a second stream of liquid.

Thus, the process for treating polyolefin granules in a treatment vessel is preferably comprising the steps of:
  Providing a bed of granules in liquid in said treatment vessel
  Withdrawing a first stream of liquid from said treatment vessel, wherein said first stream of liquid contains hydrocarboneous compounds
  Evaporating a part of said first stream of liquid to produce a first stream of vapour and a second stream of liquid
  Reintroducing said first stream of vapour into said treatment vessel
  Withdrawing a second stream of vapour from said treatment vessel wherein said second stream of vapour contains volatile hydrocarboneous compounds
  Recovering the granules from said treatment vessel
wherein said first stream of vapour has a temperature from $T_b$ to $T_b+10°$ C., wherein $T_b$ is the boiling point of the liquid at the applied pressure, and said first stream of vapour produces an upwards rising vapour stream in said treatment vessel, the superficial vapour velocity of which is no more than 0.2 m/s.

The present invention additionally provides a plant for removing volatile components from polyolefin granules comprising
(a) a treatment tank or a group of treatment tanks for degassing the polyolefin granules;
(b) a boiler or a group of boilers for producing vapour;

(c) a conduit or a group of conduits for introducing pellet slurry into the upper part of the treatment tank or to the group of treatment tanks;

(d) a conduit or a group of conduits for transporting the vapour from the boiler or the group of boilers to the lower part of the treatment tank or group of treatment tanks;

(e) a conduit or a group of conduits for withdrawing the granules from the lower part of the treatment tank or of each of the group of treatment tanks;

(f) a conduit or a group of conduits for withdrawing vapour from the upper part of the treatment tank or of each of the group of treatment tanks; and (g) a conduit or a group of conduits for withdrawing liquid from the lower part of the treatment tank or of each of the group of treatment tanks.

The plant for removing volatile components from polyolefin granules is preferably further comprising (h) a conduit or a group of conduits for transporting a part of the liquid withdrawn from the treatment tank or of each of the group of treatment tanks to the boiler.

Hence, preferably, the plant for removing volatile components from polyolefin granules is comprising (a) a treatment tank or a group of treatment tanks for degassing the polyolefin granules;

(b) a boiler or a group of boilers for producing vapour;

(c) a conduit or a group of conduits for introducing pellet slurry into the upper part of the treatment tank or to the group of treatment tanks;

(d) a conduit or a group of conduits for transporting the vapour from the boiler or the group of boilers to the lower part of the treatment tank or group of treatment tanks;

(e) a conduit or a group of conduits for withdrawing the granules from the lower part of the treatment tank or of each of the group of treatment tanks;

(f) a conduit or a group of conduits for withdrawing vapour from the upper part of the treatment tank or of each of the group of treatment tanks;

(g) a conduit or a group of conduits for withdrawing liquid from the lower part of the treatment tank or of each of the group of treatment tanks; and (h) a conduit or a group of conduits for transporting a part of the liquid withdrawn from the treatment tank or of each of the group of treatment tanks to the boiler.

The following description pertains to all embodiments of the process and plant according to the present invention.

The use of vapour having a rather low temperature slightly above its boiling point at the applied pressure at a superficial vapour velocity of lower than 0.2 m/s according to the invention not only removes volatile components more efficiently from the polyolefin granules, it furthermore facilitates the process.

In a preferred embodiment, a part of the vapour condenses upon contact with the bed of granules under these conditions. Thereby the condensate adds to the first stream of liquid which is withdrawn from said treatment vessel.

Preferably, the first stream of liquid, which is withdrawn from said treatment vessel, is capable of serving as diluent for the volatiles with higher molecular weight, typically hydrocarbons with 9 to 30 carbon atoms. The second stream of vapour, which is withdrawn from said treatment vessel, is capable of serving as diluent for the volatiles with lower molecular weight, typically hydrocarbons with 1 to 8 carbon atoms.

The polyolefin granules are preferably introduced into the treatment tank at the upper part of the treatment tank together with liquid and forms a bed of polyolefin granules in the treatment tank. Thereby, the granules and the liquid can be introduced into the vessel through the same feeding port as combined stream or through different feeding ports as separate streams. The first stream of vapour is preferably introduced into the treatment tank at the lower part of the treatment tank and preferably flows upwards the treatment tank around the bed of polyolefin granules. The bed thus operates as a settled, downwards moving bed where the polyolefin granules serve as packing in the treatment vessel.

In a specific embodiment vapour is additionally introduced in at least one further injection port, preferably multiple injection ports of the treatment vessel situated upside the lower part of the treatment tank.

The presence of liquid on the pellet surface secures an even temperature among all the polyolefin granules in the vessel. This reduces or eliminates the risk of forming hot spots in the bed. Thereby higher temperatures may be used without a risk of operational problems. It is preferred to operate at higher temperatures if this can be done without agglomeration and fusing of the granules, as the performance of the process can be improved by increasing the temperature.

The liquid is removed from the plastic material in the first stream of liquid after the treatment is completed. The volatiles, which are present in the first stream of liquid, can be easily removed by distillation or extraction.

The first stream of liquid is preferably withdrawn at the lower part of the treatment tank. A part of the first stream of liquid can be evaporated by directing the first stream of liquid into a stripper so that the solved volatiles are concentrated in the remaining second stream of liquid. The volatiles, which are present in the second stream of liquid, can be easily removed by distillation or extraction. Alternatively, the volatiles can be removed from the first stream of liquid, e.g. by distillation or extraction, prior to evaporating at least a part of said first stream of liquid to produce a first stream of vapour and a second stream of liquid. As a consequence, the first stream of vapour which is reintroduced into the treatment tank is substantially free of volatiles. In the inventive plant the treatment of the polyolefin granules and the preferable condensation of the vapour are both conducted in treatment tank so that in principle no additional cleaning unit for condensing the second stream vapour after withdrawal from the treatment tank is necessary. However, in a preferred embodiment the second stream of vapour is condensed after withdrawal from the treatment tank to form a third stream of liquid and thus separated from an off-gas that contains the volatile hydrocarboneous compounds by condensation to a third stream of liquid. This third stream of liquid may be reintroduced into the treatment tank, preferably at the upper part of the treatment tank. By means of this measure the total amount of liquid in the process can be reduced.

Prior to introduction into the treatment vessel the polyolefin granules are preferably produced by pelletizing in a pelletizer. In the pelletizer the granules are preferably combined with liquid to prepare a pellet slurry. A part of this liquid can be removed from the polyolefin granules prior to introduction into the treatment vessel and stored in a liquid tank. Preferably, said liquid stored in the liquid tank can be re-used for the preparation of the pellet slurry in the pelletizer.

In another preferred embodiment the polyolefin granules are directly fed into the treatment vessel after pelletization in the pelletizer. In this embodiment the liquid for preparing a pellet slurry in the treatment vessel is fed into the treatment vessel in a separate stream.

Prior to feeding the granules into the treatment vessel they may be passed through a screen to remove agglomerates or other large-size objects from the granules.

The treated polyolefin granules are preferably withdrawn at the lower part of the treatment tank and afterwards are preferably dried and then stored or packaged.

In a special embodiment the granules and the first stream of liquid are withdrawn from the treatment vessel together and are afterwards separated. The granules can be reintroduced into the treatment vessel. After finalizing the treatment the granules are preferably dried and then stored or packaged.

Due to the low vapour velocities and vapour temperatures energy consumption and amount of vapour are significantly reduced.

The invention particularly is concerned with the removal of volatile components from granules as produced during production of polyolefin material. These volatile components comprise monomers, hydrocarbons and hydrocarbon derivatives including substituted hydrocarbons, alcohols, ketones, aldehydes, carboxylic acids, amines, imines, epoxydes, ethers, and derivatives thereof. The process particularly removes volatile components containing 1 to 30 carbon atoms, preferably 1 to 20 carbon atoms, more preferably 1 to 15 carbon atoms and most preferably 2 to 12 carbon atoms. Preferably the removed volatile components essentially consist of hydrocarbons having 1 to 30 carbon atoms preferably 1 to 20 carbon atoms, more preferably 1 to 15 carbon atoms and most preferably 2 to 12 carbon atoms. In this respect "essentially consist" means 50 to 100%, preferably 80 to 100% of the total removed volatile components.

Preferably the components that are removed have a boiling point up to 360° C., more preferably from −104° C. to 280° C. and most preferably from 65° C. to 230° C.

In this application the terms "degassing", "devolatilization" and "treatment" are used synonymously.

The volatile components may of course comprise other substances emanating from components commonly used in the production of plastics, such as additives, fillers or modifiers. It is however preferred that the in the process according to the invention additives, fillers or modifiers are not extracted from the polyolefin granules to a substantial degree (i.e. a loss of about 10 wt %).

The process according to the present invention has a higher efficiency as regards the amount and nature of said extracted volatile components. The heat transfer to the polyolefin material is moreover improved, whereby the energy efficiency is improved. It has been surprisingly discovered that it is not necessary to apply massive amounts of vapour, air or inert gas as in the standard process for removal of residual hydrocarbons.

The polyolefin material to be treated in the process according to the present invention can be any polyolefin material suffering from unwanted emissions, taste and odour. Preferably, the polyolefin material is based on $C_2$, $C_3$ and $C_4$ to $C_8$ monomers, and more preferably is a polyethylene and/or a polypropylene resin also including additional amounts of functionalised monomers and/or further $C_2$ to $C_{10}$ comonomers.

The term "polyolefin granules" thereby denotes pellets or powder of polyolefin material as preferably defined above having a coarse particle size (i.e. a particle size of 0.5 mm or higher).

The process according to the present invention is particularly advantageous in the case of polypropylene resins which have been subjected to visbreaking. By visbreaking it is meant a process where the polymer, typically polypropylene, is treated in an extruder with peroxides or other suitable free-radical generators. The peroxide treatment results in chain scission. Consequently the molecular weight of the polymer is reduced and the molecular weight distribution becomes narrower. Typical by-products formed during the visbreaking process are light hydrocarbons, alcohols and acetone. These by-products are preferably extractable by means of the process according to the invention.

The temperature of the vapour has to be selected within a certain temperature range. This range starts at the boiling point of the liquid and ends at a temperature being 10° C., preferably 7° C. and more preferably 5° C. and most preferably 3° C. above the boiling point of the vapour (solvent) at the applied pressure.

In the case of water, the upper limit of the temperature range is 130° C., preferably 120° C. and most preferably 115° C. and the lower limit is 100° C. at the standard pressure. It is well understood that at higher pressure, the usable temperature range is shifted to higher temperatures. Applying such higher temperatures is preferred in the case of higher melting polypropylene resins, such as in the case of polypropylene which was subjected to visbreaking.

The vapour is contacted with the plastic material at a low superficial vapour velocity of below 0.2 m/s, preferably of below 0.15 m/s, more preferably below 0.1 m/s. The superficial vapour velocity is preferably at least 0.005 m/s, more preferably at least 0.01 m/s and most preferably at least 0.015 m/s.

As it is well known to those skilled in the art, the superficial velocity is the velocity of the gas in the treatment vessel as if the volume were empty. It can be calculated from $v=Q/A$, wherein $v$ is the superficial velocity, $Q$ is the volumetric flow rate of the first stream of vapour in the treatment vessel, and $A$ is the cross-sectional internal surface area within the treatment vessel.

It has surprisingly been found that higher vapour velocities do not improve the removal of the volatile components from the plastic material. By means of applying such low vapour velocities the amount of vapour in the process can be significantly reduced.

The vapour according to the present invention is preferably selected from water, methanol, ethanol, propanol, isopropanol, butanol and mixtures thereof. More preferably, the vapour is selected from water or mixtures of: water/methanol, water/ethanol, water/propanol, water/isopropanol, water/butanol, preferably in a ratio of from 4/1 to 19/1.

Most preferably, the vapour is water. The finding that water is suitable for this purpose is particularly surprising, since the solubility of monomers and $C_2$-$C_{30}$ hydrocarbons in water is very low, whereby the process is not a standard steam extraction.

Preferably the plastic material is contacted with the vapour for a time from about 15 minutes to 12 hours. More preferably, plastic material is contacted with the vapour for 30 minutes to 8 hours and most preferably from 45 minutes to 6 hours, such as from 50 minutes to 6 hours or from 1 hour to 6 hours.

The process according to the present invention is preferably applied when plastic material is in the form of granules. Granules are usually obtained in an underwater cutter. The water used in the underwater cutter usually has a temperature of about 40 to 60° C. This advantageously can be used in the present invention as a pre-warming of the pellet slurry to be used in the inventive process.

Preferably the pellet slurry when introduced into the treatment tank has a temperature of from 40 to 130° C., more preferably of from 60 to 125° C., most preferably of from 80 to 120° C. The pellet slurry can be introduced into the treatment tank directly after withdrawal from the pelletizer or it can be further heated before being introduced into the treatment tank. However, it is preferred to remove a part of the water from the granules before introducing them into the treatment vessel.

In the case of treating granules, it is furthermore a great advantage that the granules do not have to be subjected to a drying step, but can be used in an liquid slurry (=pellet slurry) preferably the pellet slurry is an aqueous slurry.

In the inventive process the temperature of the plastic material and the vapour preferably is maintained within the desired temperature range for a certain time. This can be achieved by any means known to the person skilled in the art; preferably this is achieved by injecting additional condensate into the treatment tank or by heating coils.

More preferably, this is done by additional condensate selected from water, methanol, ethanol, propanol, isopropanol, butanol and mixtures thereof into the liquid. Even more preferably, the additional condensate is selected from water or mixtures of: water/methanol, water/ethanol, water/propanol, water/isopropanol, water/butanol in a ratio of from 4/1 to 19/1.

Most preferably the warming is carried out by injection of water into the upper part of the treatment tank. The water flows around the plastic material thereby heating the granules to the desired temperature and additionally enhances the removal of hydrocarbons.

Preferably the process according to the present invention can be combined with the injection of an air stream or an inert gas stream into the overhead compartment of the treatment tank or directly into the slurry.

More preferably an inert gas stream is injected into the overhead compartment of the treatment tank or directly into the slurry.

Depending on the plastic material to be treated, it is advantageous to apply an overpressure, such as that water at 75° C. to 160° C., preferably 90° C. to 150° C., more preferably 105° C. to 145° C. and most preferably 110° C. to 140° C. is present in liquid form as condensate.

The process according to the present invention can be carried out in batch mode or in continuous form. When being carried out in continuous form, a counter current continuous flow vessel or a packed distillation column, where the residence time distribution is determined by the flow pattern caused by the streams entering and leaving the vessel is preferably used.

In the treatment tank, preferably being a packed distillation column, the plastic material preferably serves as filling of a packed column.

In a continuous process the plastic material preferably forms a settled moving bed where the granules slowly move from the upper part of the treatment vessel to the lower part of the treatment vessel. Preferably, the bed moves in a plug flow fashion. The residence time of the plastic material in the treatment vessel is preferably in the range of 15 min to 8 hours.

In a batch process the plastic material preferably serves as a fixed bed which is introduced into the treatment tank before contacting with vapour and is removed from the treatment tank after the process is stopped.

The process according to the present invention can be combined with a hydraulic pellet transport system known in the art. Such a combination allows an integrated process which has further advantages of avoiding additional drying steps and avoiding costly safety precautions such as storage under inert gas in a silo to be taken otherwise.

Preferably the plastic material is dried and/or treated by gas at temperatures above room temperature after withdrawal from the treatment tank. This removal can be carried out by any means known in the art. Thus, it can be made by using screens, centrifugal dryers, fluidized bed dryers, purging in silos in settled bed, deaeration silos or by other suitable methods, with deaeration silos being especially preferred. More preferably the removal of water is accomplished stepwise, optionally combining two or more methods. Preferably 40 to 98% and more preferably 70 to 95% of the remaining water is separated after the treatment according to the present invention.

The reduction of volatile components is based on the total emission of the untreated polymer. If not mentioned otherwise, all emission data has been determined according to method (A) as described in the experimental part. The chemical nature and amount of the volatiles is of course dependent on the comonomers and additives used and the process employed. The volatiles may thus contain monomers and comonomers and diluent used in the polymerization, oligomers formed from said monomers and comonomers, degradation products from catalyst components and process additives, degradation products of antioxidants and stabilizers and like, and compounds formed during the extrusion, for instance during the visbreaking.

In the case of granules the extracting process according to the present invention is preferably combined with a blending process mixing granules produced during the complete production time thus minimizing small quality variations. This is suitably done if the treatment is conducted as a batch process.

The present invention is furthermore directed to the use of a vapour for removal of volatile components from polyolefin granules, wherein the vapour has a temperature from Tb to Tb+10° C., wherein Tb is the boiling point of the liquid at the applied pressure, and is contacted with the polyolefin granules at a superficial vapour velocity of lower than 0.2 m/s. It is preferred that a portion of the vapour condenses. Preferably, the vapour is water vapour or a mixture of water vapour and alcohol vapour. These volatile components comprise monomers, hydrocarbons and hydrocarbon derivatives including substituted hydrocarbons, alcohols, ketones, aldehydes, carboxylic acids, amines, imines, epoxides, ethers, and derivatives thereof. The inventive use allows removal of volatile components containing 1 to 30 carbon atoms, preferably 1 to 20 carbon atoms, more preferably 1 to 15 carbon atoms and most preferably 2 to 12 carbon atoms. The inventive use allows removal of volatile components essentially consisting of hydrocarbons having 1 to 30 carbon atoms preferably 1 to 20 carbon atoms, more preferably 1 to 15 carbon atoms and most preferably 2 to 12 carbon atoms. In this respect "essentially consist" means 50 to 100%, preferably 80 to 100% of the total removed volatile components. The inventive use particularly allows removal of components with a boiling point up to 360° C., more preferably from −104° C. to 280° C. and most preferably from 65° C. to 230° C.

Preferably, the volatile components with 1 to 8 carbon atoms concentrate in the remaining vapour and the volatile components with 9 to 30 carbon atoms concentrate in the condensate.

In the inventive use, the vapour is selected from water, methanol, ethanol, propanol, isopropanol, butanol and mixtures thereof. Preferably the vapour is water vapour.

The present invention furthermore concerns a plant for removing volatile components from polyolefin granules comprising
(a) a treatment tank or a group of treatment tanks for degassing the polyolefin granules;
(b) a boiler or a group of boilers for producing vapour;
(c) a conduit or a group of conduits for introducing pellet slurry into the upper part of the treatment tank or to the group of treatment tanks;
(d) a conduit or a group of conduits for transporting the vapour from the boiler or the group of boilers to the lower part of the treatment tank or group of treatment tanks;
(e) a conduit or a group of conduits for withdrawing the granules from the lower part of the treatment tank or of each of the group of treatment tanks;
(f) a conduit or a group of conduits for withdrawing vapour from the upper part of the treatment tank or of each of the group of treatment tanks; and
(g) a conduit or a group of conduits for withdrawing liquid from the lower part of the treatment tank or of each of the group of treatment tanks.

The plant for removing volatile components from polyolefin granules is preferably further comprising
(h) a conduit or a group of conduits for transporting a part of the liquid withdrawn from the treatment tank or of each of the group of treatment tanks to the boiler.

Hence, preferably, the plant for removing volatile components from polyolefin granules is comprising
(a) a treatment tank or a group of treatment tanks for degassing the polyolefin granules;
(b) a boiler or a group of boilers for producing vapour;
(c) a conduit or a group of conduits for introducing pellet slurry into the upper part of the treatment tank or to the group of treatment tanks;
(d) a conduit or a group of conduits for transporting the vapour from the boiler or the group of boilers to the lower part of the treatment tank or group of treatment tanks;
(e) a conduit or a group of conduits for withdrawing the granules from the lower part of the treatment tank or of each of the group of treatment tanks;
(f) a conduit or a group of conduits for withdrawing vapour from the upper part of the treatment tank or of each of the group of treatment tanks;
(g) a conduit or a group of conduits for withdrawing liquid from the lower part of the treatment tank or of each of the group of treatment tanks; and
(h) a conduit or a group of conduits for transporting a part of the liquid withdrawn from the treatment tank or of each of the group of treatment tanks to the boiler.

It is preferred that the plant according to the invention is suitable for the process in all embodiments as described above.

The plant preferably comprises a dryer or group of dryers, connected to the treatment tank or group of treatment tanks via the conduit or group of conduits for withdrawing the pellet slurry from the lower part of the treatment tank or of each of the group of treatment tanks, for drying the pellet slurry withdrawn from the treatment tank or group of treatment tanks and a conduit or a group of conduits for withdrawing the granules from the dryer or group of dryers. Suitable dryer(s) are selected from centrifugal dryers, spin dryers and other conventional dryers for drying polyolefin material as known in the art. The dried polyolefin granules are preferably transported to and stored in a storage bin or silo.

The plant according to the present invention preferably comprises a condenser or a group of condensers, connected to the treatment tank or group of treatment tanks via the conduit or a group of conduits for withdrawing the vapour from the upper part of the treatment tank or of each of the group of treatment tanks, for condensing and separating the vapour from a volatile rich off-gas and a conduit or a group of conduits for withdrawing the volatile rich off-gas from the condenser or group of condensers. The condensed vapour is preferably introduced via a conduit or a group of conduits into the upper part of the treatment tank or group of treatment tanks as additional liquid in order to cool the polyolefin granules or the vapour as described above.

Further, the plant preferably comprises pumping means for establishing a liquid flow along the conduit or groups of conduits mentioned under (h) above, which is connected with the boiler or group of boilers mentioned under (d) above. The boiler or group of boilers preferably not only serve as means for producing vapour but also for removing the volatiles from the condensate which are preferably withdrawn from the boiler or group of boilers as slurry.

The plant according to the invention preferably further comprises a pelletizer for pelletizing the polyolefin resin, a pellet-liquid separator, connected to the pelletiser via the conduit or group of conduits for transporting the pellet slurry, obtained from the pelletiser, to the upper part of the treatment tank or to the group of treatment tanks; a conduit or a group of conduits for transporting the liquid from the pellet-liquid separator to a liquid tank; a conduit or a group of conduits for transporting the liquid from the liquid tank to the pelletizer; and pumping means for establishing a liquid flow along this conduit or groups of conduits. In a preferred embodiment the liquid and the granules are withdrawn from the lower part of the treatment tank or of each of the group of treatment tanks via a combined conduit or group of conduits and introduced into a pellet-liquid separator for separating the granules and the liquid. This embodiment of the plant is especially suitable for batch processes. Thereby, the granules, withdrawn from the pellet-liquid separator can be reintroduced into the upper part of the treatment tank or of each of the group of treatment tanks via a conduit or group of conduits. This measure can be taken if the amount of volatiles in the polyolefin granules is too high. In the case the treatment is finished the granules can be dried and stored as described above. For directing the stream of granules into the treatment vessel or the dryer the plant preferably comprises a valve situated in the conduit or group of conduits for transporting the granules from the pellet-liquid separator.

The liquid which is withdrawn from the pellet-liquid separator is treated as described above.

In another preferred embodiment the plant comprises a conduit from the pelletizer to the upper part of the treatment vessel for directly feeding the polyolefin granules from the pelletizer into the treatment vessel. In this embodiment the plant comprises and feeding port at the upper part of the treatment vessel and an additional conduit to that feeding port for introducing separately introducing the liquid into the treatment vessel.

In order to increase the concentration of volatiles with higher molecular weight in the condensate the treatment tank or group of treatment tanks preferably comprises one or more distillation stages at the lower part and, optionally, the upper part of the treatment tank or group of treatment tanks. More preferably the treatment tank(s) comprise from 1 to 8 distillation stages, still more preferably from 2 to 4 distillation stages. Thereby, the efficiency of the removal of volatiles with higher weight is improved.

In the treatment tank or group of treatment tanks the pellet slurry preferably serves as filling of a packed column as described above.

FIG. 1 shows an example for a plant according to the invention herein referred to as plant P1.

FIG. 2 shows an example for a plant according to the invention herein referred to as plant P2.

FIG. 3 shows an example for a plant according to the invention herein referred to as plant P3.

FIG. 4 shows an example for a plant according to the invention herein referred to as plant P4.

FIG. 5 shows an example for a plant according to the invention herein referred to as plant P5.

FIG. 1 shows one embodiment of the invention where the polymer is treated continuously.

Figure 1:
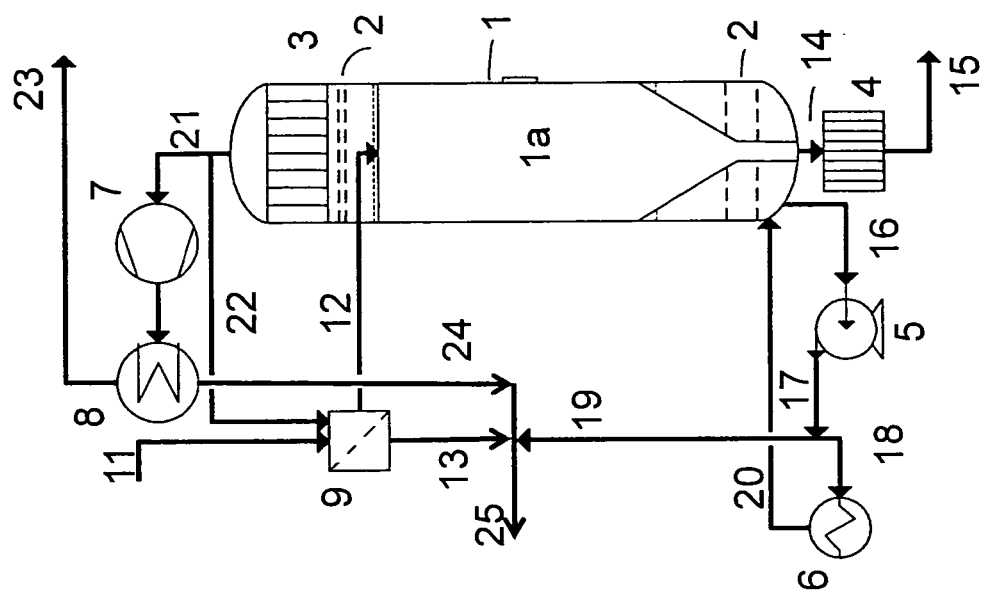
FIGS. 1 to 5 show non-limiting examples for plants according to the present invention.

The treatment vessel 1 contains a bed of wet granules 1a. Polymer and water from the pellet water system 25 come along the line 11 from a pelletizer unit. The stream is directed to the dewatering screen 9 from where the concentrated pellet stream 12 goes into the treatment vessel 1 and the water stream 13 is combined with other water streams (19, 24) and the combined water stream 25 is returned to pellet water system.

In the treatment vessel 1 the granules move downwards in the bed 1a. In the bed water and granules move downwards and a stream of steam moves upwards. Condensate is collected from the bottom of the treatment vessel 1 via the line 16. The water is then pumped with the pump 5 via line 17. A part of the water is then passed in line 18 into the boiler 6 where it is vapourized and the resulting steam is returned into the treatment vessel 1 along the line 20. The rest of the water is directed via lines 19 and 25 into the pellet water system.

In the treatment vessel 1 the steam passes distillation trays 2 where it comes into contact with the condensate. The steam flows upwards and comes into contact with granules in the bed 1a. The steam heats the granules and at the same time volatile compounds within the granules evaporate and combine with the upwards moving steam. At the top of the vessel 1 the upwards moving stream containing steam and volatile compounds pass the distillation trays 2 and come into the condenser 3. A part of the steam is condensed and the condensate is returned to the bed 1a. The rest of the steam leaves the vessel 1 via the line 21.

A part of the steam withdrawn via line 21 is directed to the dewatering screen 9 where it heats the combined stream of water and granules. The rest of the steam continues via the line 21 through the blower 7 into the overhead condenser 8. The uncondensed fraction contains mainly wet hydrocarbons and is directed to a flare via the line 23. The condensed fraction contains mainly water and is sent via the lines 24 and 25 into the pellet water system.

The granules are withdrawn from the vessel 1 through the line 14, passed through the pellet cooler 4 and then withdrawn via line 15 and transported to storage and packaging area where they are dried from residual water.

Figure 2:
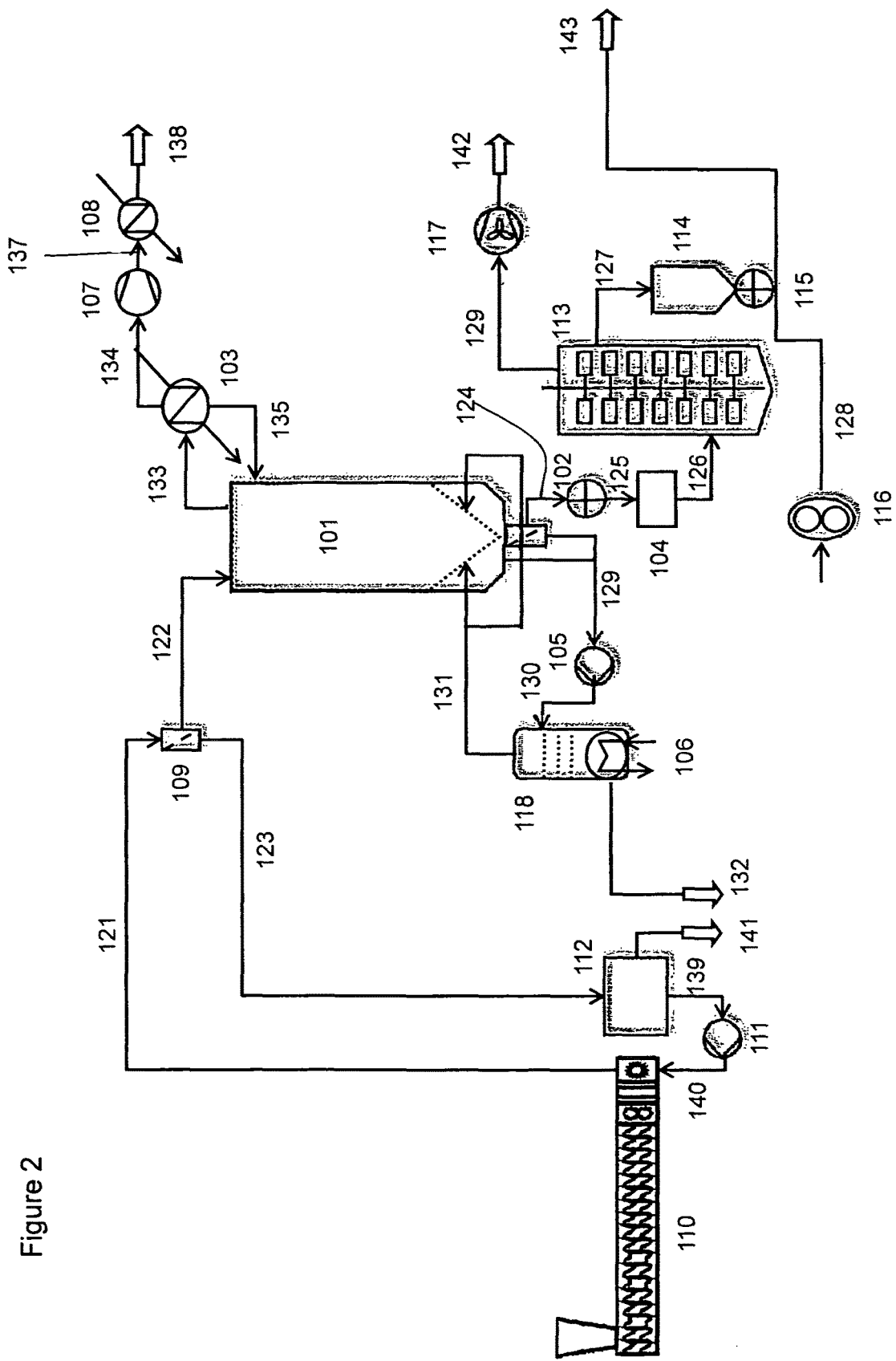

FIG. 2 shows a slightly different embodiment of the invention. The granules are produced in the compounder 110. They are hydraulically transported with pellet water via line 121 into the pellet water separator 109. A part of the water is returned 123 into the pellet water tank 112 while the granules and the rest of the water are directed to the treatment vessel 101 via line 122.

The granules move downwards in the treatment vessel 101 in substantially plug flow. They are withdrawn via line 124 from the bottom of the vessel 101 by using a rotary feeder 102 and directed to the pellet cooler 104 via line 125. From the cooler the granules are transported via line 126 to the spin drier 113. The moist gas is removed via line 129 and released into the atmosphere by the means of the fan 117 via line 142. The dry granules are directed through the line 127 into the feed bin 114, from where they are pneumatically transferred through the rotary feeder 115 and line 128 into the storage and packaging area 143. The pneumatic transfer is obtained by means of the conveying blower 116.

The condensate is removed from the bottom of the vessel 101 via line 129. By using the pump 105 it is transferred via line 130 into the stripper 118 equipped with a reboiler 106. Part of the condensate entering the stripper 118 is directed to the reboiler 106 where the condensate stream is evaporated. A water stream, containing some heavy hydrocarbons, is withdrawn from the bottom of the stripper via line 132 and directed to a waste water treatment unit. A steam stream is withdrawn from the top of the stripper and returned into the bottom part of the treatment vessel 101 via line 131.

The steam is collected from the top of the vessel 101 through line 133 and passed into the condenser 103. The condensate is returned into the vessel 101 through line 135 whereas the vapours are removed through line 134 and passed through the fan 107 and line 137 into the aftercooler 108. From there the hydrocarbon-rich off-gas may be directed to decomposition, such as flare, catalytic oxidation unit or thermal oxidation unit via line 138.

From the pellet water tank 112 a part of the water is passed through line 139 into the pump 111. The water is returned from there through line 140 into the pellet cutter of the compounder 110. The remaining part of the water from the pellet water tank 112 is removed through line 141 into the waste water treatment unit.

Figure 3:
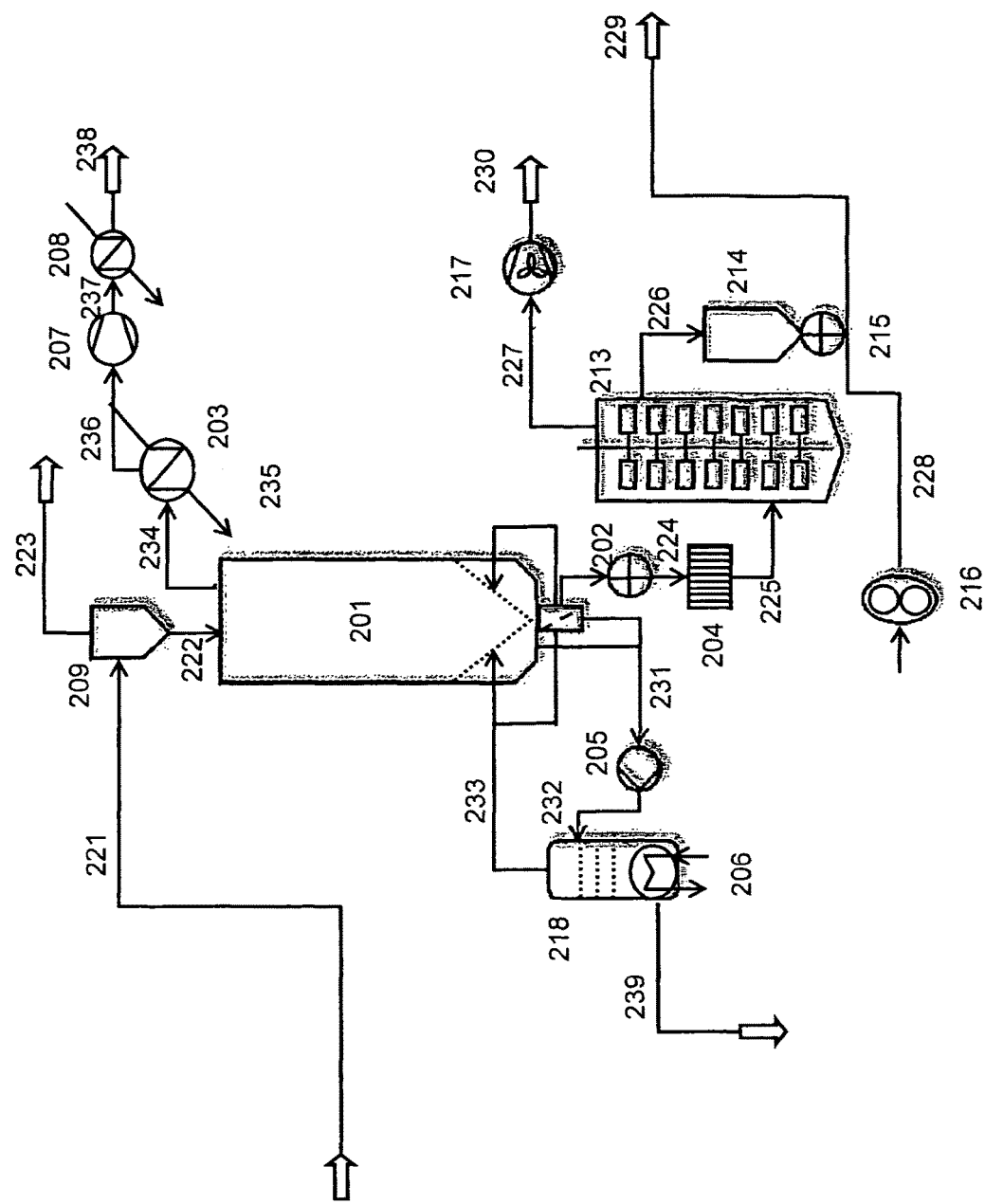

FIG. 3 shows a different embodiment of the invention. The granules are transported pneumatically, for instance in air, via line 221 to the pellet-air separator 209. The granules are taken through line 222 into the treatment vessel 201 whereas the air goes through line 223 to vent.

The granules move downwards in the treatment vessel 201 in substantially plug flow. They are withdrawn from the bottom of the vessel 201 by using a rotary feeder 202 and directed to the pellet cooler 204 via line 224. From the cooler the granules are transported via line 225 to the spin drier 213. The moist gas is removed via line 227 and released into the atmosphere by the means of the fan 217 via line 230. The dry granules are directed through the line 226 into the feed bin 214, from where they are pneumatically transferred through the rotary feeder 215 and line 228 into the storage and packaging area 229. The pneumatic transfer is obtained by means of the conveying blower 216.

The condensate is removed from the bottom of the vessel 201 via line 231. By using the pump 205 it is transferred via line 232 into the stripper 218 equipped with a reboiler 206. Part of the condensate entering the stripper 218 is directed to the reboiler 206 where the condensate stream is evaporated. A water stream, containing some heavy hydrocarbons, is withdrawn from the bottom of the stripper via line 239 and directed to a waste water treatment unit. A steam stream is withdrawn from the top of the stripper and returned into the bottom part of the treatment vessel 201 via line 233.

The steam is collected from the top of the vessel 201 through line 234 and passed into the condenser 203. The condensate is returned into the vessel 201 through line 235 whereas the vapours are removed through line 236 and passed through the fan 207 and line 237 into the aftercooler 208. From there the hydrocarbon-rich off-gas may be directed through line 238 to decomposition, such as flare, catalytic oxidation unit or thermal oxidation unit.

Figure 4:
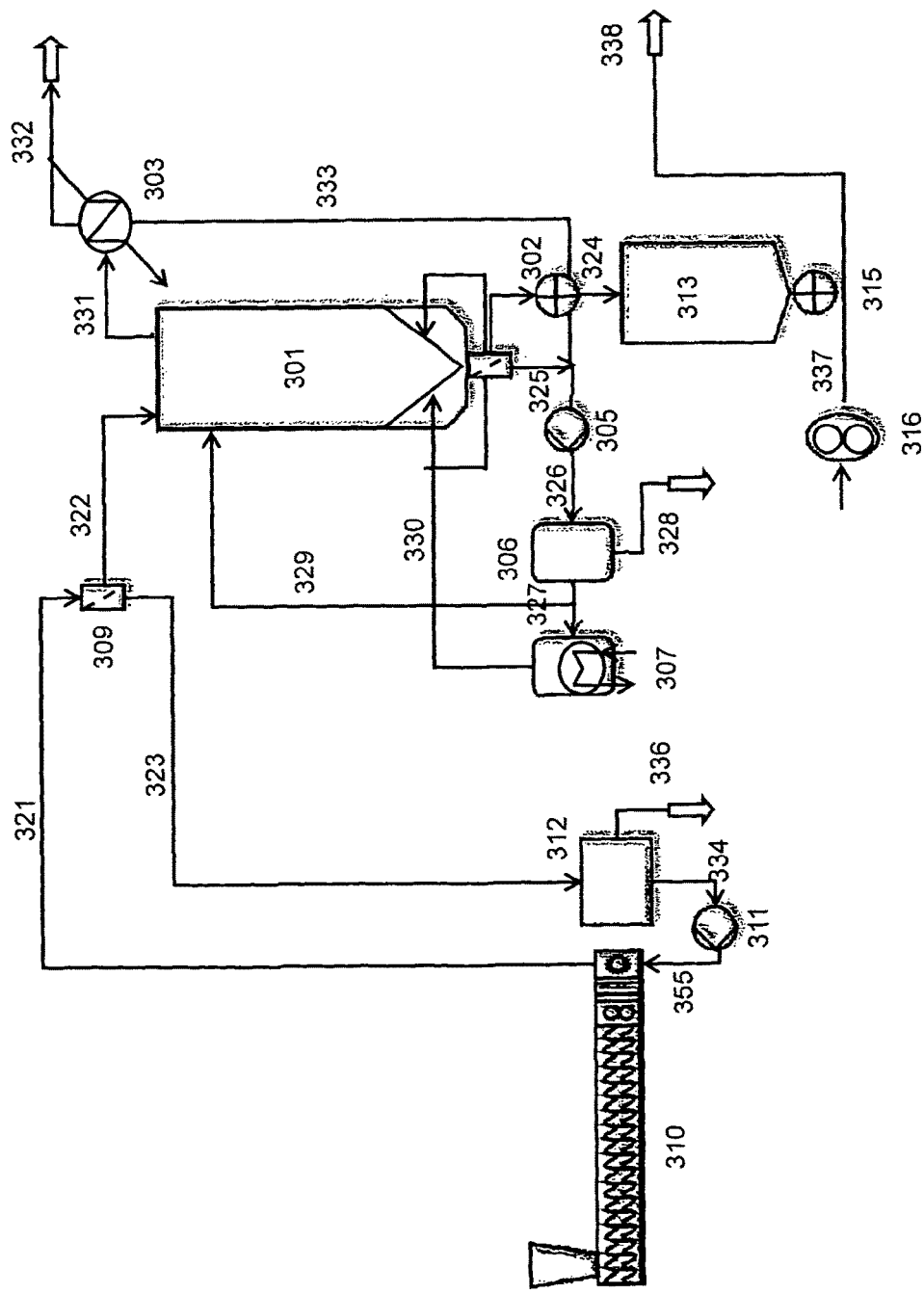

FIG. 4 shows a further embodiment of the present invention. The granules are produced in the compounder 310. They are hydraulically transported with pellet water via line 321 into the pellet water separator 309. A part of the water is returned 323 into the pellet water tank 312 while the granules and the rest of the water are directed to the treatment vessel 301 via line 322.

The granules move downwards in the treatment vessel 301 in substantially plug flow. They are withdrawn from the bottom of the vessel 301 by using a rotary feeder 302 and directed to the pellet drier 313 via line 324. In the pellet drier the granules may be dried by contacting the granules with a heated gas. The dryer may operate in plug flow or in fluidized bed conditions. The dry granules are directed through the rotary feeder 315 and line 338 into the storage and packaging area. The pneumatic transfer is obtained by means of the conveying blower 316 which blows the transport gas to the rotary feeder 315 through line 337.

The condensate is removed from the bottom of the vessel 301 via line 325. It is combined with the condensate stream entering through line 333 from the condenser 303. By using the pump 305 the combined condensate stream is transferred via line 326 into the hydrocarbon separator 306. The purified water stream is directed to the reboiler 307 through line 327 while the hydrocarbon-containing stream is passed to the hydrocarbon waste treatment unit through line 328. This can suitably be a decomposition unit, such as a flare, a catalytic oxidation unit or a thermal oxidation unit. A part of the purified water stream is directed to the upper part of the treatment vessel 301 through line 329 while the rest is directed to the reboiler 307. The water is evaporated in the reboiler 307 and the steam is withdrawn and returned into the bottom part of the treatment vessel 301 via line 330.

The steam is collected from the top of the vessel 301 through line 331 and passed into the condenser 303. The condensate is passed through line 333 and combined with the condensate stream 325. The vapours are removed through line 332 and directed to decomposition, such as flare, catalytic oxidation unit or thermal oxidation unit.

From the pellet water tank 312 a part of the water is passed through line 334 into the pump 311. The water is returned from there through line 335 into the pellet cutter of the compounder 310. The remaining part of the water from the pellet water tank 312 is removed through line 336 into the waste water treatment unit.

Figure 5:
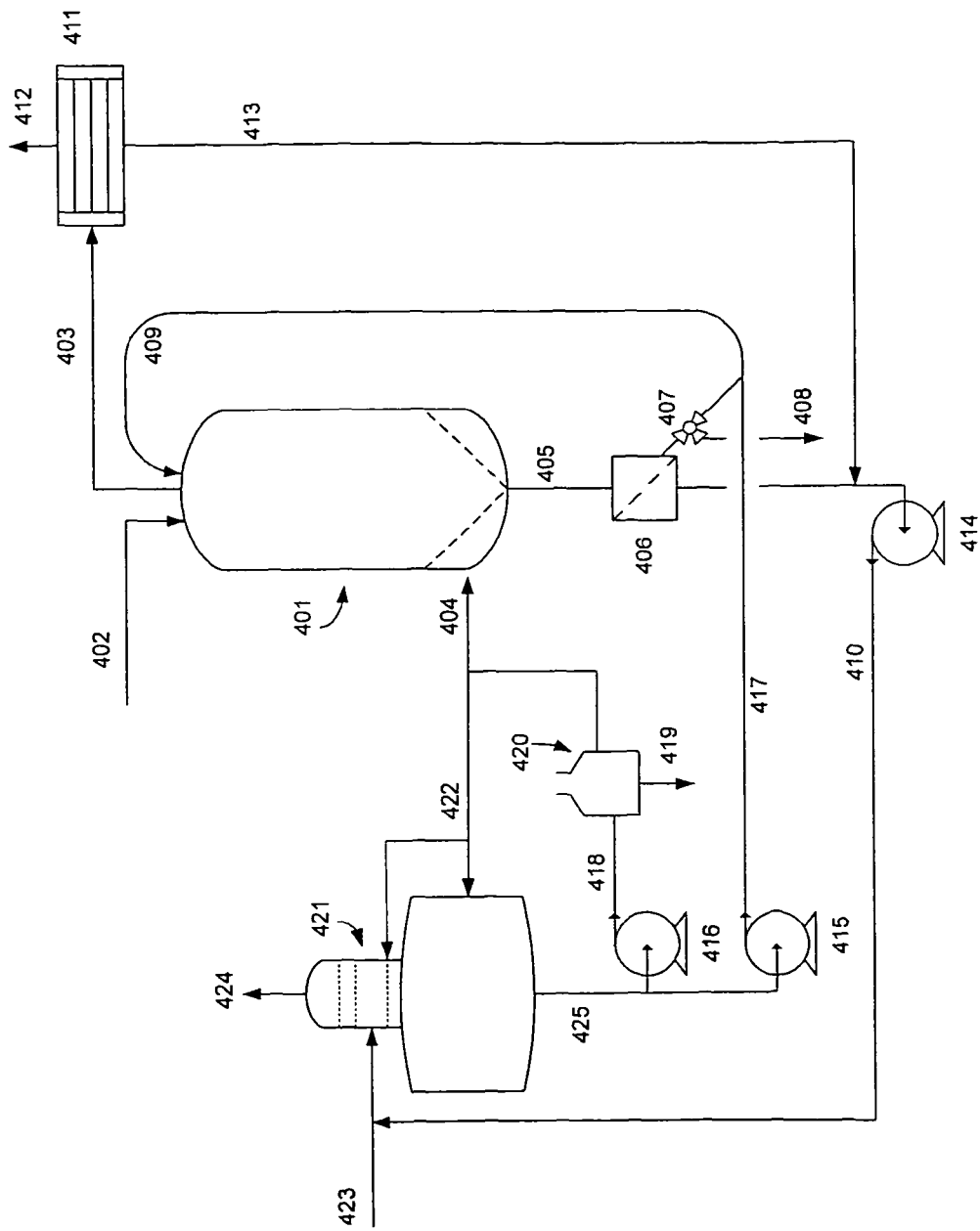

FIG. 5 shows an embodiment of the present invention which is especially suitable for batch operation.

The pellet slurry enters the treatment vessel 401 via line 402. The granules are continuously withdrawn from the treatment vessel 401 through 405 and passed to a separator where condensate is removed from the granules which are then recycled and reintroduced into the top of the vessel 401 through line 409. After the completion of the treatment the granules are withdrawn via switching the three-way valve 407 to direct the granules to the withdrawal line 408.

The condensate is pressurized with the pump 414 and passed through line 410 into the de-aerator 421. Make-up condensate is added into the de-aerator 421 through line 423. The light compounds are vented from the de-aerator through line 424.

A part of the condensate is directed from the de-aerator 421 through line 425 and the pellet recycle pump 415 and through line 417 into the pellet recycle line 409. This assists in recycling the granules to the top of the vessel 401 through line 409.

Another part of the condensate is directed with the aid of the boiler feed pump 416 through line 418 into the reboiler 420. In the reboiler 420 a majority of the condensate is evaporated. A part of the resulting steam is passed through line 422 into the de-aerator 421. The remaining part of the steam is passed through line 404 into the treatment vessel 401. A condensate stream 419 is also withdrawn from the reboiler 420. The condensate stream 419 is rich in hydrocarbons and is directed to hydrocarbon recovery.

The vapour is withdrawn from the treatment vessel 401 through line 403 and directed to the overhead condenser 411. From the condenser 411 the condensate is directed through line 413 to the pump 414 from where it is passed along line 410 into the de-aerator 421 as discussed above. A vapour stream 412 being rich in hydrocarbons is withdrawn from the condenser 411 and passed to hydrocarbon recovery.

The present invention is further characterized by means of the following examples:

1. Test Methods (available for instance from "Dokumentation Kraftfahrwesen (DKF); Ulrichstraße 14, 74321 Bietigheim Bissingen)

The content of volatiles is determined according to VDA 277:1995 using a gas chromatography (GC) device with a Optima-5 30×0.32×5.0 and a flame ionisation detector.

Temperature program: 3 minutes isothermal at 50 C, to 200 C at 12 K/min, 4 minutes isothermal at 200 C.

Injector-temperature: 200 C, detector-temperature: 250 C, carrier gas helium 5.0 at 2.0 mL/min, injection-mode split 1:20.

Quantification is done by using the detector response factor of aceton for all peaks and calculating the sum as µg Carbon/g.

The integration parameters are specified in the calibration method in VDA 277:1995, paragraph 5.

MFR

The melt flow rate is measured as the $MFR_2$ in accordance with ISO 1133 (230° C., 2.16 kg load) for polypropylene resp. (190° C., 2.16 kg) for polyethylene and is indicated in g/10 min. The MFR is an indication of the flowability, and hence the processability, of the polymer. The higher the melt flow rate, the lower the viscosity of the polymer.

Xylene Solubles

Determination of Xylene Soluble Fraction (XS):

2.0 g of polymer is dissolved in 250 ml p-xylene at 135° C. under agitation. After 30 minutes the solution is allowed to cool for 15 minutes at ambient temperature and then allowed to settle for 30 minutes at 25° C. The solution is filtered with filter paper into two 100 ml flasks.

The solution from the first 100 ml vessel is evaporated in nitrogen flow and the residue is dried under vacuum at 90° C. until constant weight is reached.

$$XS\% = (100 \cdot m \cdot Vo)/(mo \cdot v);$$

mo=initial polymer amount (g); m=weight of residue (g); Vo=initial volume (ml); v=volume of analysed sample (ml).

Determination of Amorphous Rubber Fraction of the Xylene Solubles (AM):

The solution from the second 100 ml flask in the xylene solubles analysis is treated with 200 ml of acetone under vigorous stirring. The precipitate is filtered and dried in a vacuum oven at 90° C.

$$AM\% = (100 \times m_2 \times v_0)/(m_0 \times v_1), \text{ wherein}$$

$m_0$=initial polymer amount (g)
$m_1$=weight of precipitate (g)

$v_0$=initial volume (ml)
$V_1$=volume of analyzed sample (ml)

Superficial Vapour Velocity

The superficial velocity is the velocity of the gas in the treatment vessel as if the volume were empty.

It is calculated from v=Q/A, wherein v is the superficial velocity, Q is the volumetric flow rate of the steam in the treatment vessel, and A is the cross-sectional internal surface area within the treatment vessel. Q is calculated from the density of the steam and its flow in kg/h according to the formula Q=steam flow/density, wherein the density of the steam at 1 bar and 105° C. is 0.5812 kg/m$^3$. A is 0.15 m$^2$.

Intrinsic Viscosity

The intrinsic viscosity is measured according to DIN ISO 1628/1, October 1999 (in decalin at 135° C.)

2. Examples

Reference Example 1 (Re1)

A heterophasic copolymer of ethylene and propylene having MFR$_2$ of 11 g/10 min, a fraction of xylene soluble polymer (at room temperature) of 30%, an ethylene content of 12.5% by weight, the intrinsic viscosity of the xylene soluble fraction of 2.5 dl/g and an ethylene content of the xylene soluble fraction of 38% by weight was used as a base resin.

Example 1

Into a treatment vessel having a volume of 150 dm$^3$ was charged 60 kilograms of polypropylene granules as described above in Reference Example 1. The temperature in the treatment vessel was 100° C. and the pressure was 1 bar(a). Into the bottom of the vessel was then introduced steam having a temperature of 105° C. at a flow rate of 10 kg/h. From the bottom of the vessel condensate was withdrawn. From the top steam was withdrawn. A part of the steam was condensed in a condenser located at the top of the vessel and the condensate was returned to the column. The process was allowed to operate for 6.25 hours after which the granules were recovered and dried. Samples were taken from the granules at the residence times of 4.25 and 6.25 hours. The volatile compounds were analyzed and the results can be found in Table 1.

Example 2

The procedure of Example 1 was repeated except that the steam flow rate was 20 kg/h and the residence time was 7.25 hours. Samples were taken at the times of 4.25 hours and 7.25 hours.

Example 3

The procedure of Example 2 was repeated except that the residence time was 8 hours and samples were taken every 2 hours.

Example 4

The procedure of Example 3 was repeated except that the flow rate of steam was 15 kg/h.

Comparative Example 1 (CE1)

The procedure of Example 1 was repeated except that the steam flow rate was 220 kg/h and samples were taken after 5 hours and 7.5 hours.

Reference Example 2 (RE2)

A compound was produced from 57.7° A) of the polymer of Reference Example 1, 10% of MG9621B (HDPE resin sold by Borealis having a density of 936 kg/m$^3$ and an MFR$_2$ of 12 g/10 min) 1.5% of MB95-black 7-PE40 carbon black masterbatch, 8% of Engage 8200 (an ethylene-based elastomer sold by Dow having a density of 870 kg/m$^3$ and an MFR$_2$ of 5 g/10 min), 9% of HF955MO (a high-flow propylene homopolymer sold by Borealis having an MFR$_2$ of 20 g/10 min), 20% of talc (Jetfine 3CA), 0.2% Irganox 1010, 0.1% Irgafos 168, 0.2% Crodamide ER beads, 0.1% Cyasorb UV-3808PP5 and 0.1% Chimassorb 119. In addition the compound contained a small amount of a carrier polymer for the additive masterbatch. The volatile content can be found in Table 1.

Example 5

The procedure of Example 1 was repeated except that the compound of Reference Example 2 was used, the residence time was 6 hours and no intermediate sample was taken. The data can be found in Table 1.

Example 6

The procedure of Example 5 was repeated by using another sample of the compound of Reference Example 2.

Reference Example 3 (RE3)

A compound was produced from 59% of the polymer of Reference Example 1, 10% of MG9621B (HDPE resin sold by Borealis having a density of 936 kg/m$^3$ and an MFR$_2$ of 12 g/10 min) 1.5% of MB95-black 7-PE40 carbon black masterbatch, 8% of Engage 8200 (an ethylene-based elastomer sold by Dow having a density of 870 kg/m$^3$ and an MFR$_2$ of 5 g/10 min), 20% of talc (Jetfine 3CA), 0.2% Irganox 1010, 0.1% Irgafos 168, 0.2% Crodamide ER beads, 0.1% Cyasorb UV-3808PP5 and 0.1% Chimassorb 119. In addition the compound contained a small amount of a carrier polymer for the additive masterbatch. The volatile content can be found in Table 1.

Example 7

The procedure of Example 5 was repeated except that the compound of Reference Example 3 was used. The data can be found in Table 1.

TABLE 1

| Example | Steam flow, kg/h | Steam velocity, m/s | Headspace, μgC/g at 0 h | Headspace, μgC/g, at 4 h | Headspace, μgC/g at 6 h | Headspace, μgC/g, at 8 h |
|---|---|---|---|---|---|---|
| R1 | | | | | | |
| 1 | 10 | 0.032 | 77 | 37 | 32 | |
| 2 | 20 | 0.066 | 77 | 33* | 15* | |
| 3 | 15 | 0.049 | 78 | 38 | 31 | 28 |
| 4 | 20 | 0.066 | 90 | 34 | 28 | 21 |
| CE1 | 220 | 0.745 | 79 | 39** | 33** | |
| RE2 | | | 14 | | | |
| | | | 44 | | | |
| 5 | 10 | 0.032 | 17 | | 3 | |
| 6 | 10 | 0.032 | 51 | | 6 | |
| RE3 | | | 152 | | | |
| 7 | 10 | 0.032 | 149 | | 5 | |

*Samples were taken at the times of 4.25 hours and 7.25 hours.
**Samples were taken after 5 hours and 7.5 hours.

It can be seen that the increased steam rate of Comparative Example 1 does not result in a higher purity of the polyolefin granules but only increases the steam consumption.

The amount of additives was analysed from the polymer samples of all examples collected after the pellet steam distillation process and no loss of additives has been detected in any of the examples.

For Example 1 samples were taken from the condensate withdrawn from the bottom of the vessel after treatment times of 0.5, 1 and 2 hours. The volatile compounds (hydrocarbons HC and the total amount of organic compounds TOC) were analyzed and the results can be found in Table 2.

TABLE 2

| Example | Steam flow, kg/h | Steam velocity, m/s | Volatiles at 0 h HC mg/l | Volatiles at 0 h TOC mg/l | Volatiles at 1 h HC mg/l | Volatiles at 1 h TOC mg/l | Volatiles at 2 h HC mg/l | Volatiles at 2 h TOC mg/l |
|---|---|---|---|---|---|---|---|---|
| 1 | 10 | 0.032 | 0.2 | 1.7 | 0.3 | 7.9 | 0.1 | 6.3 |

The invention claimed is:

1. A process for treating polyolefin granules in a treatment vessel comprising the steps of:
   providing a bed of granules in liquid in said treatment vessel
   withdrawing a first stream of liquid from said treatment vessel, wherein said first stream of liquid contains hydrocarboneous compounds
   introducing a first stream of vapour into said treatment vessel
   withdrawing a second stream of vapour from said treatment vessel wherein said second stream of vapour contains volatile hydrocarboneous compounds
   recovering the granules from said treatment vessel
   wherein said first stream of vapour has a temperature from Tb to Tb+10° C., wherein Tb is the boiling point of the liquid at the applied pressure, and said first stream of vapour produces an upwards rising vapour stream in said treatment vessel, the superficial vapour velocity of which is no more than 0.2 m/s.

2. The process according to claim 1, wherein the polyolefin granules contain hydrocarbons selected from $C_1$ to $C_{30}$ hydrocarbons as impurity and wherein at least a part of said hydrocarbons are removed from said granules in said treatment vessel.

3. The process according to claim 1, wherein the vapour is selected from water vapour, methanol vapour, ethanol vapour, propanol vapour, isopropanol vapour, butanol vapour and mixtures thereof.

4. The process according to claim 1, wherein the polyolefin granules are selected from a polyolefin material based on $C_2$, $C_3$ and $C_4$ to $C_8$ monomers.

5. The process according to claim 1, wherein a portion of said first stream of vapour condensates upon contact with said bed of granules.

6. The process according to claim 1, wherein the bed of granules is contacted with the vapour for 15 minutes to 12 hours.

7. The process according to claim 1, wherein the polyolefin granules withdrawn from the treatment tank are dried before storage and packaging.

8. The process according to claim 1, wherein the second stream of vapour withdrawn from the treatment tank is condensed to a third stream of liquid and separated from an off-gas that contains volatile hydrocarboneous compounds.

9. The process according to claim 8, wherein the third stream of liquid is reintroduced into the treatment vessel.

10. The process according to claim 1, wherein the polyolefin granules are pelletized and combined with liquid prior to introduction into the treatment vessel.

11. The process according to claim 10, wherein a part of the liquid is removed from the granules prior to introduction into the treatment vessel and stored in a liquid tank.

12. The process according to claim 1, wherein the granules and the first stream of liquid are withdrawn from the treatment vessel together, separated and the granules are reintroduced into the treatment vessel.

13. The process according to claim 1, wherein The process further comprises the step of
   evaporating a part of said first stream of liquid to produce the first stream of vapour and a second stream of liquid,
   and the step of
   introducing a first stream of vapour into said treatment vessel
   is the step of
   reintroducing said first stream of vapour into said treatment vessel.

14. A plant for removing volatile components from polyolefin granules comprising
  (a) a treatment tank or a group of treatment tanks (1) for degassing the polyolefin granules;
  (b) a boiler or a group of boilers (6) for producing vapour;
  (c) a conduit or a group of conduits (12) for introducing pellet slurry into the upper part of the treatment tank or to the group of treatment tanks (1);
  (d) a conduit or a group of conduits (20) for transporting the vapour from the boiler or the group of boilers (6) to the lower part of the treatment tank or group of treatment tanks (1);
  (e) a conduit or a group of conduits (14) for withdrawing the granules from the lower part of the treatment tank or of each of the group of treatment tanks (1);
  (f) a conduit or a group of conduits (21) for withdrawing vapour from the upper part of the treatment tank or of each of the group of treatment tanks (1); and
  (g) a conduit or a group of conduits (16) for withdrawing liquid from the lower part of the treatment tank or of each of the group of treatment tanks (1).

15. The plant according to claim 14, further comprising
  (h) a conduit or a group of conduits (18) for transporting a part of the liquid withdrawn from the treatment tank or of each of the group of treatment tanks (1) to the boiler (6).

16. The plant according to claim 14, wherein the treatment tank or group of treatment tanks comprises one or more distillation stages (2) at the lower part and, optionally, the upper part of the treatment tank or group of treatment tanks (1).

17. A method for removal of volatile components from polyolefin granules, wherein vapour is provided, which has a temperature from Tb to Tb+10° C., wherein Tb is the boiling point of the liquid at the applied pressure, and the vapour is contacted with the polyolefin granules at a superficial vapour velocity of lower than 0.2 m/s.

18. The process of claim 1, wherein said first stream of vapour is introduced into said treatment vessel at a flow rate of from 10 kg/h to 20 kg/h.

* * * * *